United States Patent
Kampinga et al.

(10) Patent No.: US 12,514,909 B2
(45) Date of Patent: Jan. 6, 2026

(54) LACTATE-PROTECTED HYPOGLYCEMIA TO TREAT GLYCOLYSIS DEPENDENT PATHOLOGICAL CONDITIONS, IN PARTICULAR CANCER

(71) Applicant: LACA MEDICAL B.V., Groningen (NL)

(72) Inventors: Jakob Kampinga, Groningen (NL); Maarten Willem Nicolaas Nijsten, Groningen (NL); Antonio Maria Pesenti, Milan (IT); Alberto Zanella, Lissone (IT)

(73) Assignee: LACA MEDICAL B.V., Groningen (NL)

( * ) Notice: Subject to any disclaimer, the term of this patent is extended or adjusted under 35 U.S.C. 154(b) by 1032 days.

(21) Appl. No.: 17/270,925

(22) PCT Filed: Aug. 27, 2019

(86) PCT No.: PCT/EP2019/072810
§ 371 (c)(1),
(2) Date: Feb. 24, 2021

(87) PCT Pub. No.: WO2020/043708
PCT Pub. Date: Mar. 5, 2020

(65) Prior Publication Data
US 2021/0330750 A1    Oct. 28, 2021

(30) Foreign Application Priority Data

Aug. 28, 2018    (EP) .................................... 18191260

(51) Int. Cl.
| | |
|---|---|
| *A61K 38/28* | (2006.01) |
| *A61K 9/00* | (2006.01) |
| *A61K 31/155* | (2006.01) |
| *A61K 31/191* | (2006.01) |
| *A61K 31/7004* | (2006.01) |
| *A61K 45/06* | (2006.01) |
| *A61P 33/00* | (2006.01) |
| *A61P 35/00* | (2006.01) |

(52) U.S. Cl.
CPC ............ *A61K 38/28* (2013.01); *A61K 9/0019* (2013.01); *A61K 31/155* (2013.01); *A61K 31/191* (2013.01); *A61K 31/7004* (2013.01); *A61K 45/06* (2013.01)

(58) Field of Classification Search
CPC .... A61K 38/28; A61K 9/0019; A61K 31/155; A61K 31/191; A61K 31/7004; A61K 45/06
See application file for complete search history.

(56) References Cited

U.S. PATENT DOCUMENTS

2018/0117249 A1    5/2018    Pennington et al.

OTHER PUBLICATIONS

Grodsky et al., "Insulin and the Pancreas," Ann Rev Physiol. 28: 347-380 (1966) (Year: 1966).*
Doron, "Bacterial Infections: Overview," International encyclopedia of Public health, 2008:273-282 (Year: 2008).*
National Institute of Cancer—understanding and related topics, accessed Aug. 21, 2014 at URL: cancer.gov/cancertopics/understandingcancer, 63 pages (Year: 2014).*
Merck manual breast cancer, accessed Aug. 21, 2014 at URL merckmanuals.com/professional/gynecology-and-obstetrics/breast-cancer/breast-cancer (Year: 2014).*
Merck manual malaria accessed Jun. 15, 2024 at URL merckmanuals.com/professional/infectious-diseases/extraintestinal-protozoa/malaria (Year: 2024).*
Ngo et al, "The Warburg effect: molecular aspects and therapeutic possibilities," Mol Biol Rep 42:825-834 (2015) (Year: 2015).*
Benedetti et al. "A Prospective Randomized Clinical Trial of Perioperative Treatment with Octreotide in Pancreas Transplantation," Am J Surgery 175:14-17 (1998) (Year: 1998).*
Van Niekerk DD, Penkler GP, du Toit F, Snoep JL. Targeting glycolysis in the malaria parasite *Plasmodium falciparum*. FEBS J. Feb. 2016;283(4):634-46. doi: 10.1111/febs.13615. Epub Jan. 4, 2016. PMID: 26648082.
Nijsten MW, van Dam GM. Hypothesis: using the Warburg effect against cancer by reducing glucose and providing actate. Med Hypotheses. Jul. 2009;73(1):48-51. doi: 10.1016/j.mehy.2009.01.041. Epub Mar. 4, 2009. PMID: 19264418.
Goodwin, Matthew L et al. "Lactate and cancer: revisiting the warburg effect in an era of lactate shuttling." Frontiers in nutrition vol. 1 27. Jan. 5, 2015, doi:10.3389/fnut.2014.00027.
Ganapathy-Kanniappan S, Geschwind JF. Tumor glycolysis as a target for cancer therapy: progress and prospects. Mol Cancer. Dec. 3, 2013;12:152. doi: 10.1186/1476-4598-12-152. PMID: 24298908; PMCID: PMC4223729.
Coley AF, Dodson HC, Morris MT, Morris JC. Glycolysis in the african trypanosome: targeting enzymes and their subcellular compartments for therapeutic development. Mol Biol Int. 2011;2011:123702. doi: 10.4061/2011/123702. Epub Apr. 11, 2011. PMID: 22091393; PMCID: PMC3195984.
International Search Report and Written Opinion for the International Patent Application No. PCT/EP2019/072810, mailed Nov. 29, 2019, 15 pages.

* cited by examiner

*Primary Examiner* — Julie Ha
*Assistant Examiner* — Kristina M Hellman
(74) *Attorney, Agent, or Firm* — KDW Firm PLLC

(57) ABSTRACT

A kit includes the components lactic acid, insulin and glucose, and optionally one or more components selected from a glucagon inhibitor, an alpha-beta adrenergic blocker and an antidiabetic agent, for treating a glycolysis-dependent pathological condition in a human or animal. A treatment includes intravascular, in particular intravenous, delivery of the components lactic acid, insulin and glucose into the circulation of the human or animal to be treated to induce hypoglycemia and hyperlactatemia. The glycolysis-dependent pathological condition is selected from the group consisting of cancer, bacterial infection or parasite infection.

19 Claims, No Drawings

LACTATE-PROTECTED HYPOGLYCEMIA TO TREAT GLYCOLYSIS DEPENDENT PATHOLOGICAL CONDITIONS, IN PARTICULAR CANCER

This is a national stage application filed under 35 U.S.C. § 371 of pending international application PCT/EP2019/072810, filed Aug. 27, 2019, which claims priority to European Patent Application No. 18191260.1, filed Aug. 28, 2018, the entirety of which applications are hereby incorporated by reference herein.

FIELD OF THE INVENTION

The invention relates to a kit comprising multiple components for the treatment of glycolysis-dependent pathological conditions in humans or animals.

BACKGROUND OF THE INVENTION

Cancer is a leading cause of death globally, with a rising incidence and responsible for more than 8 million deaths in 2015. Globally, nearly 1 in 6 deaths is due to cancer. Many different forms of cancer exist and various forms of treatment also exist, such as surgery, chemotherapy, radiotherapy, hormone therapy, immunotherapy and other forms of targeted therapy. Many forms of cancer cannot be cured and not all therapies are equally successful in all patients and thus there still is a large need for new therapeutic modalities.

The present invention aims to directly interfere with the metabolism of the cancer cell and cancer tissue. Whereas normal tissues may intermittently produce significant amounts of lactate from glycolysis under stressed aerobic conditions, many cancers do so continuously even when provided with ample oxygen. This marked aerobic glycolysis by cancer is called the Warburg effect. This effect is a unique property of cancer and is defined as the uptake of abundant amounts of glucose by the tumor whilst producing large amounts of lactic acid, even when sufficient oxygen is present.

$^{18}$F-desoxyglucose positron emission tomography (FDG-PET) scanning detects malignant tissues with increased glucose uptake resulting from the Warburg effect. The routine use of FDG-PET for diagnosis and/or follow-up of cancer has immensely expanded. FDG-PET scans demonstrate the Warburg effect in cancer of the biliary tract, bladder, bone, breast, central nervous system, cervix, colon, esophagus, kidneys, larynx, liver, lung, nasopharynx, oropharynx, ovaries, pancreas, prostate, rectum, skin, soft tissues, stomach, testes, thyroid and uterus. FDG-PET also demonstrates the Warburg effect in more disseminated malignancies such as Hodgkin lymphoma, leukemia, melanoma, multiple myeloma and non-Hodgkin lymphoma. The fact that these lists cover the vast majority of types of cancer underscores the central role of the Warburg effect in cancer.

The extent of FDG-PET positivity is strongly linked with tumor acidosis, and the extent of FDG-PET positivity and tumor acidosis are both associated with a worse clinical prognosis, thus directly linking FDG-PET with the Warburg effect and prognosis.

The high lactic acid production of the cancer cell can lead to acidification of the extracellular tumor tissue and its environment. This local acidosis and elevated lactate with or without hypoxia indeed characterizes many tumors where more pronounced acidosis is being associated with increased invasive potential. It has also been demonstrated that local lactic acidosis serves to degrade the tissue that surrounds the cancer by inducing apoptosis and necrosis of non-malignant cells.

Even when malignant cells have sufficient ATP generated by oxidative phosphorylation, they still use and require glucose for specific glycolysis-powered processes, which are frequently membrane-bound. These glycolysis-powered processes (e.g. rapid extrusion of chemotherapeutic agents by so-called ABC-transporters) serve the tumor cells' invasive (migration) and defensive purposes and facilitate resistance to chemotherapy. Likewise glycolysis also facilitates resistance to radiotherapy and immunotherapy by enabling the tumor to create a hypoxic and acidotic microenvironment which makes the tumor less sensitive to radiation and inhibits the effectiveness of immune cells to attack cancer.

Thus, strategies have been proposed to inhibit glycolysis as anti-cancer treatment. Although the effect of decreased glucose is strongly tumoricidal in vitro, deep hypoglycemia itself can be rapidly lethal in vivo, since the host normally requires glucose. This led to the proposition to provide a 'salvage fuel' for the non-malignant tissues while simultaneously reducing the systemic glucose levels with insulin to withhold the fuel needed for tumor growth. Compounds like glycerol have been proposed, although glycerol does not bypass glycolysis and even may induce increased glucose levels.

Glycolysis can be orders of a magnitude faster than oxidative phosphorylation. In humans and animals therefore, under physiological or pathophysiological circumstances, lactate serves as the indispensable buffer that allows these two ATP-generating processes to proceed independently and optimally. Consequently, 'lactate shuttles' are present at the microscopic and the macroscopic levels, i.e. from the cellular level to the whole body level. Thus, similar to glucose, lactate is a major fuel that is oxidized by organs such as the heart, skeletal muscles, brain, kidneys and the liver.

Lactate's role as a buffer fuel explains the ability of the body to metabolize large amounts of endogenous or exogenous lactate as demonstrated in patients who undergo so-called high volume continuous veno-venous hemofiltration (CVVH) with a lactate-based substitution fluid. These patients can metabolize lactate for prolonged periods at rates that can sustain metabolism.

Cancer cells that display the Warburg effect may have difficulty in utilizing lactate as a fuel, since they preferentially produce ATP through glycolysis and are accustomed to producing lactate but not consuming it. It was therefore hypothesized by Nijsten & Van Dam (*Medical Hypotheses* 73 (2009) 48-51) that the local or systemic induction of hypoglycemia induced by insulin coupled with (sodium-) lactate administration as a salvage fuel will adversely affect tumors that display the Warburg effect in their growth while leaving normal tissues unharmed.

It is known from acid-base and electrolyte physiology that the intravenous administration of large amounts of sodium lactate has two important side effects: systemic metabolic alkalosis and hypernatremia. These side effects are unacceptable and make sodium lactate unsuitable to induce sustained hyperlactatemia in human or animal patients.

SUMMARY OF THE INVENTION

It is therefore the object of the present invention to create a feasible and safe protocol to arrive at a lactate-protected hypoglycemic state in which cancer cells are deprived of their energy source and are thus severely inhibited or damaged in their ability to grow and may even die. With-holding glucose may also potentiate several established important cancer treatments, such as chemotherapy or radiotherapy, since chemo-resistance or radio resistance is often glycolysis dependent. In addition, it is expected that immunotherapy will be more effective when the bulk of the cancer cells have been destroyed or that the elements that are directly or indirectly responsible for maintaining the immunosuppressive acidotic environment inside the tumor are severely hampered by the damaging effects of the temporary period of hypoglycemia.

According to the invention, a kit is provided that comprises multiple components that when used in a specific order induce an effective hypoglycemic state protected by hyperlactatemia. The kit comprises lactic acid (HLa), insulin, glucose, and optionally an alpha-beta blocker and a glucagon inhibitor. The kit can further comprise an antidiabetic agent.

It was found that the administration of high doses of HLa instead of sodium lactate (NaLa) did not lead to metabolic alkalosis or hypernatremia, which may be damaging to patients. HLa can be used as such or in combination with a minor fraction of NaLa. Of the total lactate delivered the fraction of NaLa should preferably be lower than 20%, but may be higher when the risk on metabolic alkalosis and hypernatremia is low or reduced by additional treatments or when only a short period of the hypoglycemic state is required.

The sustained administration of HLa in amounts necessary to largely support host metabolism has not been performed before.

The administration of HLa requires a dedicated system to avoid acute hemolysis. Such system is for example an ex vivo perfusion circuit to avoid acute hemolysis upon contact of concentrated HLa with the erythrocytes. Suitably this can be done by a dialysis circuit where HLa and the ultrafiltrate are premixed before recombination with full blood, as described by Zanella et al. (Anesthesiology 2014; 120: 416-24). The HLa is subsequently completely mixed with the blood. The lactate level in blood normally varies between 0.5 and 1.5 mmol/L. In the treatment of the invention the level should be increased to 8 to 10 mmol/L, but it is envisaged that higher or lower levels may also be useful.

Insulin is used to lower the glucose level in the body to deprive the tumor cells from their preferred energy source. In a controlled fashion the glucose level is lowered to approximately 25% of normal levels. In one embodiment, insulin is administered together with glucose, according to the so-called "clamping" technique. Clamping makes the glucose level far better controllable. The clamping technique is widely used for scientific purposes but has neither been used for therapeutic purposes nor been used to achieve the very low glucose levels that are achieved by the invention.

According to the invention, hypoglycemic levels that are very low (i.e. <2 mmol/L) and are sustained for hours near a pre-specified target, are facilitated by potent and rapidly reversible inhibition of counter-responses and by simultaneous glucose administration to stabilize glucose levels at any target of 0.5 mmol/L or higher.

The sole administration of (very large) insulin boluses makes it very difficult to achieve a desired glucose target as well as to achieve the desired duration of target maintenance. Both overshoot and undershoot can easily occur when insulin is administered alone.

Glucose is released from the liver and the kidneys both by gluconeogenesis and glycogenolysis when the body detects impending hypoglycemia. Under physiological conditions hypoglycemia induces the release of glucagon which antagonizes insulin's effects by stimulating hepatic glucose release, subsequently raising the blood glucose out of the hypoglycemic range. In the treatment of the invention this action of glucagon is suppressed with a glucagon inhibitor that is part of the kit.

A second component of the physiological counter-response to hypoglycemia is the adrenergic stress response that includes the release of adrenalin (epinephrine) that also stimulates hepatic glucose release. Therefore, an alpha-beta adrenergic blocker is included to inhibit this component of the compensatory response.

Furthermore, an antidiabetic agent that inhibits gluconeogenesis is preferably included. This agent is administered prior to administration of insulin to facilitate lower insulin doses.

In one embodiment, the glycogen level of the patient is as low as possible before the treatment starts. This can be achieved by fasting prior to the treatment.

The present invention thus relates to a kit-of-parts comprising a unique combination of pharmaceutical compounds that are administered to the patient in a particular order and in particular doses to arrive at a lactate-protected hypoglycemia (LPH) state. Once the LPH state is reached it is maintained for a specific period to induce sufficient damage to the cancer cells.

The present invention can be used in the treatment of a number of different cancers, in which the Warburg effect plays a role and which are thus glycolysis-dependent for their maintenance. The invention is in particular useful in treating cancer and other pathological conditions that are strongly or completely glycolysis-dependent. Strongly glycolysis-dependent means that although the cancer or pathological condition may utilize other sources to generate energy or to increase its biomass, glycolysis is responsible for key pathways that allow the cancer or infection to progress considerably faster than without glucose.

The invention is thus in particular useful of treating cancer of the biliary tract, bladder, bone, breast, central nervous system, cervix, colon, esophagus, kidneys, larynx, liver, lung, nasopharynx, oropharynx, ovaries, pancreas, prostate, rectum, skin, soft tissues, stomach, testes, thyroid and uterus. The Warburg effect is also found in more disseminated malignancies such as Hodgkin lymphoma, leukemia, melanoma, multiple myeloma and non-Hodgkin lymphoma, which can therefore also be treated according to the invention.

The present kit and resulting metabolic state are also suitable for treatment of other glycolysis-dependent pathological conditions in humans or animals. Such glycolysis-dependent pathological conditions include certain bacterial infections, and specific parasitic infections, such as malaria or trypanosomiasis. Analogous to FDG-PET-positive cancer these pathogens preferably or solely depend on glucose and will thus be adversely affected by glucose-restriction.

The four parasites that cause malaria in man (*Plasmodium falciparum, Plasmodium malariae, Plasmodium ovale, Plasmodium vivax*) are all strictly dependent on glucose for ATP-generation. Thus, inhibition of glucose metabolism has improved outcome in malaria. In the main pathogens in human trypanosomiasis (*Trypanosoma brucei* and *Trypanosoma cruzi*) glucose is also essentially the only carbon-source and the only source of ATP, thus rendering them vulnerable to limited glucose availability. These parasitic infections can thus also be treated according to the invention.

Many bacteria that can cause disease in man use large amounts of glucose both for growth and ATP-production. These include Gram-positive bacteria (e.g. *Staphylococcus* species and *Streptococcus* species), Gram-negative bacteria (e.g. many Enterobacteriaceae including *E. coli, Enterobacter* species, *Proteus* species), *Pseudomonas* species, and anaerobic bacteria (e.g. *Clostridium* species, *Lactobacillus* species, *Bacteroides* species).

Likewise for many fungi and yeasts (e.g. *Aspergillus* species and *Candida* species) glucose also serves as a key carbon source for growth and ATP-production. Even during infection in humans or animals, blood and tissue levels of glucose de facto constitute an abundant nutrient source under virtually all circumstances. Thus, targeting glucose availability through reducing circulating levels provides a logical means to combat infection.

DETAILED DESCRIPTION OF THE INVENTION

The invention thus relates to a kit, comprising a number of components for use in a treatment method that leads to hyperlactatemia and hypoglycemia. This method can be used for the treatment of pathological conditions that are dependent on glycolysis. During glycolysis energy is produced from glucose. When the patient is deprived of glucose and is protected by a high level of lactate as an alternative energy source, the pathogenic processes that depend on glucose as their energy source are hampered and will lead to demise of the cancer cells, bacteria, fungi, yeasts or parasites, particularly in conjunction with certain other treatments.

The first component of the kit is HLa. This compound is the first to be administered although it may optionally be administered after the patient received drugs to reduce the glucose release by the liver and/or after the patient has fasted to decrease the amount of glycogen in the liver. The lactate component of NaLa ($Na^+ + La^-$) is metabolized into bicarbonate after lactate is fully oxidized. As a result sodium bicarbonate will accumulate, which can rapidly lead to both unwanted hypernatremia and unwanted metabolic alkalosis when large amounts are infused. In contrast to NaLa, however, HLa (pKa 3.8) is completely oxidized to $CO_2$. However HLa is strongly acidic and it will be fully dissociated ($H^+ + La^-$) at physiological pH. As the required amounts of HLa constitute a large and concentrated proton load, HLa is delivered in a manner that prevents cellular damage such as acute hemolysis.

HLa is suitably administered as pure HLa or in a mix with NaLa in a ratio HLa:NaLa of at least 75:25, preferably at least 80:20, more preferably at least 90:10, most preferably at least 95:5 in a diluent such as water or saline 0.9%. Varying the infused HLa:NaLa ratio allows the arterial pH of the host to be guided to a desired range, which could range from acidosis (e.g. pH 7.30) to alkalosis (e.g. pH 7.55) depending on what is deemed most effective for (adjuvant) tumor treatment. The diluent is selected from water and NaCl0.9%. Preferably, the diluent is water.

To prevent fluid overload, HLa must be administered in a concentrated fashion. Preferably, the concentration of the HLa solution ranges from 1000 mmol/L to 4400 mmol/L. The delivery rate of the HLa solution in the blood circulation ranges from 0 to 10 mmol/min, preferably 4 mmol/kg/h, or 5 mmol/min or 300 mmol/h in an adult patient with an average weight of 75 kg. The desired resulting circulating level of lactate in the body is 5 to 20 mmol/L, preferably 6 to 15 mmol/L, more preferably 8 to 10 mmol/L. It may take between 15 to 60 minutes, and typically around 30 minutes to reach this latter level.

Once the desired hyperlactatemic state is achieved the glucose level in the body is lowered by means of an insulin bolus followed by an insulin infusion combined with measures to block the physiological hypoglycemic counter-responses. Preferably short-acting insulin is used and the amount of insulin to be administered is based on the body weight and the baseline glucose level of the patient to be treated. Suitably, a loading dose is administered first, followed by a maintenance dose that is lower. The number of units (U) of insulin to be administered as initial bolus may range from 0.2 to 4 U/kg, preferably 0.4 to 1 U/kg, most preferably 0.5 U/kg. Insulin is commercially available in concentrations such as 100 or 500 U/ml and diluted in a pharmaceutically acceptable diluent.

Normal human fasting glucose levels are 4.0 to 6.5 mmol/L, thus the target level of 1.5 mmol/L is only a quarter to a third of normal levels. This target level of 1.5 mmol/L is expected to have a sufficient cancer-damaging effect, especially when this level is maintained for longer periods. When lower or higher levels of glucose (i.e. 0.5 to 2.5 mmol/L) are desired, this can be achieved with the same clamping approach, with the administration of more or less insulin and less or more glucose. After 30 to 120 minutes, typically, 90 minutes from the start of the treatment the glucose level has reached the target level of 1.5±0.1 mmol/L. This low level of glucose is maintained for a certain period of time. This hypoglycemic period may lie between 0.5 to 12 h, preferably 2 to 8 h, most preferably the period is 4 h, because it is expected that most cancer cells susceptible for hypoglycemia will have been damaged or killed by then. The shortest optimal period of time may differ between the different types and/or sizes of the tumor and could for example be established by either 'trial and error' or by using diagnostic methods during the LPH procedure. In a preferred embodiment, the desired glucose level is maintained by means of the 'clamping' technique. Clamping comprises the simultaneous administration of both glucose and insulin, to achieve more stable glucose levels. To prevent fluid overload, glucose is preferably administered as a concentrated solution (40% to 50%), preferably 50%. It is initially given at a rate of 2 to 20 μmol/kg/m and typically at a rate of 12 μmol/kg/m (or 54 mmol/h or 10 g/h in a 75-kg adult) and subsequently adjusted on the basis of regular blood glucose measurements. Preferably, minimum amounts of glucose are administered.

Simultaneous glucose administration also introduces an additional safety feature since in case there is suspicion of adverse effects resulting from hypoglycemia, blood glucose levels can rapidly be increased.

A further component of the kit is an alpha-beta blocker, i.e. a combined alpha and beta adrenergic blocker. The alpha-beta blocker can be selected from a range of alpha-beta blockers, such as labetalol, carvedilol and dilevalol. In a preferred embodiment, the combined alpha-beta blocker is labetalol. Labetalol is intravenously administered at such a rate that it results in a reduction of the baseline heart-rate, preferably by approximately 10/min. The labetalol infusion rate can vary from 0.05 to 1.5 mg/kg/h, and typically will be 0.2 mg/kg/h to achieve this physiological target. Labetalol may be dissolved in a suitable diluent, such as NaCl 0.9% or glucose 5%.

The kit further comprises a glucagon inhibitor. The inhibitor can be selected from the group of somatostatin analogs, such as octreotide, lanreotide or pasireotide, or could be somatostatin itself. Because a short biological duration of action is desired, the preferred embodiment of the glucagon inhibitor is octreotide or somatostatin given intravenously, most preferably octreotide. The dose of intravenously administered octreotide is 0.1 to 1 µg/kg bolus, preferably 0.2 µg/kg to 0.6 µg/kg, most preferably 0.4 µg/kg. Then, guided by glucose levels, a continuous intravenous delivery rate of the octreotide solution is ranging from 0 µg/kg/h to 1 µg/kg/h, preferably 0.05 µg/kg/h to 0.8 µg/kg/h, most preferably 0.05 µg/kg/h to 0.3 µg/kg/m/h. The octreotide is preferably a solution of 500 µg octreotide in 50 ml of NaCl 0.9%.

In a further embodiment, the kit comprises an oral antidiabetic compound, preferably of the biguanide class, such as metformin or phenformin. In a preferred embodiment, the antidiabetic compound is metformin. The antidiabetic metformin inhibits glucose production in the liver through inhibition of gluconeogenesis. Metformin may also decrease the required dosage of insulin to achieve the desired hypoglycemia level. The enteral dose of metformin administered ranges from 500 mg to 1500 mg, preferably 1000 mg. Metformin is administered as tablet(s), preferably in the conventional non-controlled release form, although the controlled release form may also be used. The timing of the metformin administration is 24 h to 1 h before the desired moment that the intended hypoglycemic state is achieved, preferably 12 h to 2 h, most preferably 6 h to 4 h. When the first dose of 500 mg to 1500 mg of metformin can be administered more than 6 h before the time that the desired hypoglycemic state is expected to be achieved, a second identical dose may be given at 2 h or less before the time that the desired hypoglycemic state is expected to be achieved.

In one embodiment, the treatment thus comprises optionally inhibiting the glucose excretion from the liver of the human or animal, administering lactic acid by continuous infusion to the human or animal, and when a steady hyperlactatemic state is reached in which the vital organs of the human or animal consume sufficiently large amounts of lactate as an energy source, administering insulin to the human or animal to lower the glucose level until a hypoglycemic state is reached, maintaining the hypoglycemic state for a certain amount of time, ending the administration of insulin and administering glucose to the human or animal until a normal level of blood glucose is reached and ending the administration of lactic acid.

In one embodiment, the treatment comprises:
a) optional pre-procedural fasting,
b) optionally administering the metformin, in particular one day before the start of the administration of the lactic acid,
c) subsequently administering the lactic acid or a combination of lactic acid and sodium lactate to increase the lactate concentration in the body of the human or animal to about 5 to 20 mmol/L, preferably about 8 to 10 mmol/L,
d) subsequently administering a loading dose of the insulin to lower the blood glucose level to about 0.5 to 2.5 mmol/L, preferably about 1.5 mmol/L, accompanied by continuous administration of insulin to maintain the glucose level at 0.5 to 2.5 mmol/L, preferably 1.5 mmol/L to achieve a hypoglycemic state,
e) maintaining the hypoglycemic state for 0.5 to 12 h, preferably about 4 hours supported by "clamping", and
f) ceasing the administration of insulin and if necessary administer glucose to restore the physiological glucose level in the human or animal body and cease the administration of lactic acid.

Suitably, octreotide and/or labetalol are administered before and/or during the administration of insulin.

Octreotide is suitably administered after step c). Labetalol is suitably administered after step b).

In one embodiment, administration of octreotide and/or labetalol is stopped before step f).

The lactic acid is preferably administered by means of an ex vivo perfusion circuit.

The LPH state is maintained for a certain period of time, in particular from 30 min to 12 h, preferably from 2 h to 8 h, most preferably 3 h to 5 h.

Subsequently, the normal blood glucose concentration in the body is restored by the discontinuation of insulin administration, discontinuation of glucagon inhibition and discontinuation of alfa-beta adrenergic inhibition as well as by the administration of glucose, preferably the same concentrated glucose solution as mentioned earlier for use during hypoglycemic clamping. The delivery rate of the intravenous glucose solution in this recovery phase is ranging from 5 to 40 µmol/kg/min, preferably 10 to 20 µmol/kg/min, and after achievement of normoglycemic glucose levels, is rapidly tapered to 0 µmol/kg/min.

In case the treatment method comprises a fasting step prior to the delivery of the components of the kit, then the human or animal has not eaten for 6 to 48 hours, preferably 12 to 36 hours, most preferably 24 hours.

Prior to the delivery of the components the human or animal may optionally be anesthetized.

The present invention will be further illustrated in the Example that follows. The Example is not intended to limit the invention in any way. In this Example the following abbreviations are used:

[Glu] circulating glucose mmol/L (multiply by 18 to calculate mg/dL)
[Lac] circulating lactate concentration in mmol/L
HG-HL hypoglycemia+hyperlactatemia combination
HG(1.5)HL(8) a HG-HL-state with a [Glu] of 1.5 mmol/L (27 mg/dL) and a [Lac] of 8 mmol/L
HLa lactic acid
etCO$_2$ end-tidal CO$_2$ concentration

EXAMPLE

Introduction

Inducing marked hyperlactatemia (i.e. 8 to 10 mmol/L) may protect the body against the deleterious effects of hypoglycemia. The state of combined hypoglycemia and hyperlactatemia (HG-HL) is metabolically possible as underscored by observations in several disease states in humans (Oldenbeuving et al. Anaesth Intensive Care 2014; 42: 507-11). In animals and humans, syndromes that typically involve liver failure can be characterized by the HG-HL state. Since it has been observed that HG-HL states as extreme HG(0.7 mmol/L)-HL(25 mmol/L) have been coupled with an intact consciousness, this particular state has been called lactate-protected hypoglycemia (LPH). LPH may be much more important than a mere scientific curiosity, since a tumor that displays the Warburg-effect may be uniquely vulnerable to low glucose levels whilst the cancer may be unable to use lactate, unlike normal vital tissues in the body. The induction of HG-HL for four hours will profoundly and immediately change cancer metabolism and is expected to lead to irreversible damage to the tumor.

Briefly, hypoglycemia was induced by administering a loading dose of i.v. insulin under pharmacological inhibition of the (hepatic) counter-response. Sodium lactate (NaLa)

has mostly been used in experiments to induce brief or mild hyperlactatemia. But high or sustained doses of NaLa rapidly lead to severe hypernatremia and metabolic alkalosis. Therefore, sustained hyperlactatemia was achieved herein by administering large amounts of lactic acid (HLa) through an extracorporeal system.

With the current state of scientific knowledge and available technological means, achieving HG-HL and subsequent the return to normoglycemia in a controlled manner, can only be done with a large animal model. In this Example a pig model is used.

In this study a 30 kg pig was anesthetized and received a concentrated HLa (pH 1.6) solution to achieve a [Lac] of 8 mmol/L. After the initiation of anesthesia a bolus of octreotide followed by a continuous infusion of octreotide and labetalol were administered to inhibit hypoglycemic counter-responses. Then, after hyperlactatemia was established, an insulin bolus and continuous infusion of insulin were titrated to achieve a [Glu] of between 1.3 and 1.7 mmol/L (25 to 30 mg/dL). Once the HG (1.5 mmol/L) HL(8 mmol/L) state was achieved, this was maintained for 4 h. Then normoglycemia was allowed to return.

To facilitate stability of glucose-levels both during and after hypoglycemia, a concentrated glucose 50% infusion was given together with insulin. This clamping principle is very common in experiments designed to achieve stable hyper-, normo- or mild hypoglycemic levels. As is usual in clamping, the glucose and insulin infusion rates are adjusted regularly on the basis of the last [Glu].

In addition to [Glu] and [Lac], key metabolites such as pH, blood gasses, calcium and phosphate were frequently measured in the arterial blood samples.

Materials and Methods

This example entails achievement and sustaining [Glu] at ~1.5 mmol/L for 4 hours in a pig under a [Lac] of 8 mmol/L.

The preparation started the day before the intervention at 17:00. No food was given to the pig after this time.

On the morning of the intervention the pig ate a small fatty snack combined with 500 mg of metformin. The inhibitory action of metformin on gluconeogenesis is expected to start within 3 h.

Induction of anesthesia was started together with ventilation and initiation of an extracorporeal circuit for administration of the concentrated HLa. A bolus of 0.03 mg/kg medetomidine, a bolus of 4 mg/kg tiletamine-zolazepam and a bolus of 2 to 2.5 mg/kg 1% propofol were delivered intravenously. After intubation, volume-controlled ventilation was started. The respiratory rate was adjusted to target etCO$_2$ of 35 to 45 mmHg and a tidal volume of 8 to 10 ml/kg. The tidal volume was later adjusted when required on etCO$_2$, pCO$_2$ and pH. Then a 2-lumen dialysis catheter was surgically placed into the internal jugular vein. An unfractionated heparin bolus of 5000 IU (200 IU/kg) was administered and CVVH was initiated with unfractionated heparin (400 IU/ml) at 1 ml/h, titrated to an activated clotting time (ACT) of 250 to 300 seconds.

Hyperlactatemia (HL 8 mmol/L) was induced by titrated administration of 40% HLa and started at 50 ml/h via a veno-venous (VV) extracorporeal circuit.

Counter-response inhibition was achieved by subsequent intravenous delivery of labetalol (5 mg/ml) at 3 ml/h titrated to a relative heart rate reduction of 10/m, and an intravenous bolus of 25 μg octreotide (10 μg/ml), then the octreotide continuous infusion was proportionally adjusted to keep [Glu] in the desired hypoglycemic range.

Once [Lac] was 8 to 10 mmol/L, the 40% HLa delivery was adjusted to between 20 to 50 ml/h.

Induction of the desired hypoglycemia level was achieved with loading doses of 10 to 50 U of insulin depending on the initial [Glu] and with initial administration of 50% glucose at 5 ml/h. Depending on the subsequent [Glu], insulin infusion rates were varied between 0 to 60 U/h. If necessary, an additional bolus dose of insulin was given at least 30 minutes after the initial delivery using the same criteria as described before.

Once both a [Glu] of 1.3 to 1.7 and a [Lac] of 8 to 10 mmol/L was reached, this HG(1.5)HL(8) state was maintained for 4 hours using the clamping technique. Approximately halfway during the HG(1.5)HL(8)-phase the octreotide infusion was stopped as the $T_{1/2}$ of octreotide is longer than $T^{1/2}$ of insulin and because sustained suppression of the hypoglycemic counter response by octreotide might prolong the duration of glucose 50% support during the normoglycemia restoration phase.

During the HG-HL phase, sliding scale adjustments of insulin and glucose 50% pumps were executed. Near the end of the HG-HL-phase the insulin pump and labetalol pump were stopped, HLa infusion was reduced and stopped after the end of the planned 4 h period of HG-HL.

The glucose 50% infusion rate was adjusted and eventually tapered to zero until stable normoglycemia was achieved.

At 90 minutes after the end of the HG-HL-phase normoglycemia was achieved without exogenous glucose or lactate support.

Throughout the experiment arterial pH and sodium levels were maintained within the desired range, in contrast to what would be observed after pure NaLa infusion. Furthermore, no hemodynamic instabilities, electrocardiographic or rhythm disturbances were observed, since hypoglycemia alone can induce cardiac conduction/repolarization abnormalities.

The invention claimed is:

1. A method of inducing hyperlactatemia and hypoglycemia in a human or animal subject, comprising administering to the subject lactic acid, insulin and glucose in an amount sufficient to induce hypoglycemia and hyperlactatemia in the subject, optionally wherein the administration is via an intravenous route,
   wherein the method comprises
   a) optional pre-procedural fasting,
   b) optionally administering metformin one day before the start of administration of the lactic acid,
   c) administering the lactic acid or a combination of lactic acid and sodium lactate to increase the subject's lactate concentration to 5-20 mmol/L,
   d) administering a loading dose of insulin to lower the subject's blood glucose level to 0.5-2.5 mmol/L, followed by continuous administration of insulin to maintain the subject's blood glucose level at 0.5-2.5 mmol/L,
   e) maintaining a hypoglycemic state for a period of time of from 0.5-12 hours by using clamping, and
   f) ceasing the administration of lactic acid, optionally ceasing the administration of insulin and glucose to restore the physiological glucose level in the subject.

2. The method of claim 1, comprising increasing the subject's lactate concentration to 8-10 mmol/L.

3. The method of claim 1, comprising lowering the subject's blood glucose level to 1.5 mmol/L and maintaining the subject's blood glucose level at 1.5 mmol/L.

4. The method of claim 1, wherein the period of time is 4 hours.

5. The method of claim 1, wherein the method comprises administering octreotide, labetalol, or a combination thereof, before the administration of insulin, or both before and during the administration of insulin.

6. The method of claim 1, wherein the method comprises administering the lactic acid by continuous infusion, optionally by an ex vivo perfusion circuit.

7. The method of claim 1, wherein the method comprises administering the lactic acid as a combination of lactic acid and sodium lactate (NaLa) in a ratio HLa:NaLa of at least 75:25.

8. The method of claim 1, wherein the method comprises administering the glucose together with the insulin to achieve lower glucose levels by clamping, and wherein the glucose is 40% to 50% glucose.

9. The method of claim 1, wherein the method comprises administering metformin to the subject prior to administration of the lactic acid, optionally administering the metformin one day prior to the start of lactic acid administration.

10. The method of claim 9, wherein the method comprises administering labetalol to the subject after administering metformin.

11. The method of claim 1, wherein the method comprises lowering glycogen content in the subject by fasting prior to administration of the lactic acid.

12. The method of claim 1, wherein the method comprises:
   (i) inhibiting glucose excretion from the subject's liver;
   (ii) administering the lactic acid by continuous infusion to the subject until reaching a steady state;
   (iii) administering the insulin to the subject to lower the subject's blood glucose level until reaching a hypoglycemic state;
   (iv) maintaining the hypoglycemic state for 0.5-12 hours;
   (v) following step (iv), ending the administration of insulin and administering glucose to the subject until achieving a normal level of the subject's blood glucose; and
   (vi) ending the administration of lactic acid.

13. The method of claim 12, wherein step (i) comprises administering to the subject octreotide, labetalol, or a combination thereof.

14. The method of claim 13, wherein the method comprises administering to the subject octreotide, labetalol, or a combination thereof before the administration of insulin or during the administration of insulin.

15. The method of claim 13, wherein the method comprises administering octreotide to the subject after step (ii).

16. The method of claim 13, wherein the method comprises stopping the administering of octreotide or labetalol before step (vi).

17. The method of claim 12, wherein the method comprises administering metformin to the subject prior to administration of the lactic acid, optionally administering the metformin one day prior to the start of lactic acid administration.

18. The method of claim 12, wherein the method comprises lowering glycogen content in the subject by fasting prior to administration of the lactic acid.

19. The method of claim 17, wherein the method comprises administering labetalol to the subject after administering metformin.

* * * * *